United States Patent
Yoshikawa et al.

(10) Patent No.: US 8,559,548 B2
(45) Date of Patent: Oct. 15, 2013

(54) WIRELESS COMMUNICATION APPARATUS

(75) Inventors: Yoshishige Yoshikawa, Shiga (JP); Katsunori Tanie, Osaka (JP); Hiromi Toyota, Kyoto (JP)

(73) Assignee: Panasonic Corporation, Kadoma-shi, Osaka (JP)

(*) Notice: Subject to any disclaimer, the term of this patent is extended or adjusted under 35 U.S.C. 154(b) by 96 days.

(21) Appl. No.: 13/390,222

(22) PCT Filed: Aug. 26, 2010

(86) PCT No.: PCT/JP2010/005258
§ 371 (c)(1),
(2), (4) Date: Feb. 13, 2012

(87) PCT Pub. No.: WO2011/030515
PCT Pub. Date: Mar. 17, 2011

(65) Prior Publication Data
US 2012/0140839 A1 Jun. 7, 2012

(30) Foreign Application Priority Data

Sep. 11, 2009 (JP) ................... 2009-210080
Nov. 11, 2009 (JP) ................... 2009-257739
Mar. 1, 2010 (JP) ................... 2010-043937

(51) Int. Cl.
*H04B 15/00* (2006.01)

(52) U.S. Cl.
USPC ...................................... 375/285

(58) Field of Classification Search
USPC ............... 375/219, 285, 295, 316, 346, 350
See application file for complete search history.

(56) References Cited

U.S. PATENT DOCUMENTS

| 7,339,502 B2* | 3/2008 | Furtner | 341/55 |
| 2002/0039888 A1 | 4/2002 | Hama | |
| 2006/0202640 A1* | 9/2006 | Alexandrov | 315/291 |

FOREIGN PATENT DOCUMENTS

| EP | 1 102 421 A2 | 5/2001 |
| EP | 1253753 A2 | 10/2002 |
| EP | 1253753 A3 | 11/2003 |
| JP | 2002-111603 A | 4/2002 |
| JP | 2002-319946 A | 10/2002 |
| JP | 2002-323222 A | 11/2002 |
| JP | 2007-060625 A | 3/2007 |
| JP | 2007-158976 A | 6/2007 |
| JP | 2008-085719 A | 4/2008 |

OTHER PUBLICATIONS

International Search Report for International Application No. PCT/JP2010/005258, dated Nov. 30, 2010, 1 page.
European Search Report in corresponding European Application No. 10815116, dated May 28, 2013, 6 pages.

* cited by examiner

*Primary Examiner* — Khanh C Tran
(74) *Attorney, Agent, or Firm* — Brinks Hofer Gilson & Lione

(57) ABSTRACT

The radio communication device offers data communication with no adverse effect of EMI radiation. In response to EMI radiation detected by the radiation detector, the controller changes the normal communication mode into the avoidance communication mode. In the avoidance communication mode, the transmitter prepares a transmission packet so as to satisfy the following relational expressions: $T_1=T_0/2/M$ and $T_2=T_0/2$ (where, $T_0$ represents the cycle of an AC power source; $T_1$ represents the transmission time; and $T_2$ represents the transmission cycle). The transmission power changer determines the transmission power by multiplying $T_2/T_1$ to the transmission power in the normal communication mode. The transmission rate changer determines the transmission rate by multiplying $T_2/T_1$ to the transmission rate in the normal communication mode. The transmission packet is transmitted in synchronization with the stopping time of EMI radiation detected by the timing detector.

5 Claims, 12 Drawing Sheets

WIRELESS COMMUNICATION APPARATUS

TECHNICAL FIELD

The present invention relates to a radio communication device that offers communications through radio waves. Particularly, it relates to a radio communication device capable of maintaining the communication distance even under electromagnetic interference (EMI) radiation of an operating microwave oven.

BACKGROUND ART

The magnetron of a microwave oven oscillates at a frequency of around 2.45 GHz and radiates electromagnetic interference (EMI) waves to the outside. When a radio communication device that communicates with other devices at around the frequency above, due to the EMI radiation, the communication distance is significantly shortened, or in the worst case, the radio communications are blocked. To address the problems, for example, patent literatures 1 through 3 suggest methods for avoiding the EMI radiation.

Microwave ovens generally operate on a commercial power source, such as 100V AC and 200V AC, and the alternating frequency thereof is 50 Hz or 60 Hz. A microwave oven periodically has a voltage of zero (i.e., the voltage passes the zero cross point) and the magnetron temporarily stops the oscillation at around the zero cross point. To avoid the EMI radiation, conventional radio communication devices offer data transmission synchronized with the zero cross point.

However, a conventional method has the following problems:

The effective transmission rate in avoidance communication (i.e., the data transmission synchronized with the zero cross point so as to avoid the radiation effect) decreases compared to normal communication;

The conventional devices always operate in the avoidance communication regardless of whether a microwave oven is in operation or not. Under some conditions even when the microwave oven is in operation, the normal communication allows the radio communication device to have a transmission rate higher than that in the avoidance communication. However, because conventional radio communication devices have not exactly detected the operating conditions of a microwave oven, the constant use of avoidance communication is necessary.

Some conditions mentioned above are, for example, as follows: the case where the radio communication devices communicate with each other in a short distance; the case where the magnetron has decrease in oscillation intensity by power control of a microwave oven; and the case where a microwave oven temporarily stops oscillation.

As described above, conventional methods have pending problems: an effective transmission rate is not achieved in the avoidance communication; but the constant use of avoidance communication is the reliable way to avoid the radiation interference.

PTL 1 Japanese Patent Unexamined Publication No. 2002-111603
PTL 2 Japanese Patent Unexamined Publication No. 2002-319946
PTL 1 Japanese Patent Unexamined Publication No. 2002-323222

SUMMARY OF THE INVENTION

To address the problems above, the present invention provides a radio communication device capable of maintaining an effective transmission rate even in the avoidance communication. At the same time, the radio communication device avoids transmission interference with no necessity of constant use of the avoidance communication.

The radio communication device of the present invention has a receiver for receiving data, a radiation detector, a timing detector, a controller, a transmitter, a transmission power changer, and a transmission rate changer. Receiving the data fed from the receiver, the radiation detector detects EMI radiation from the data, and the timing detector detects the timing of no EMI radiation. In response to detected EMI radiation by the radiation detector, the controller switches the normal communication mode into the avoidance communication mode. In the avoidance communication mode, the transmitter prepares transmission packets so as to satisfy the following relational expressions: $T_1=T_0/2/M$ and $T_2=T_0/2$ (where, $T_1$ represents the time required for transmission; $T_2$ represents the cycle of transmission; $T_0$ represents the cycle of an AC power source; and $M \geq 4$). The transmission power changer determines the transmission power of the transmission packets in the avoidance communication mode by multiplying $T_2/T_1$ to the transmission power in the normal communication mode. Similarly, the transmission rate changer determines the transmission rate of the transmission packets in the avoidance communication mode by multiplying $T_2/T_1$ to the transmission rate in the normal communication mode. Such prepared transmission packets are transmitted by the transmitter so as to be synchronized with the timing of no EMI radiation detected by the timing detector.

With the structure above, the radio communication device of the present invention has no necessity of constant use of the avoidance communication mode for avoiding transmission interference. Besides, the radio communication device maintains an effective transmission speed even when a microwave oven is in operation.

DETAILED DESCRIPTION OF THE PREFERRED EMBODIMENTS

The exemplary embodiments of the present invention are described hereinafter with reference to the accompanying drawings. The exemplary embodiments are not to be construed as limitation on the present invention.

First Exemplary Embodiment

Figure 1:
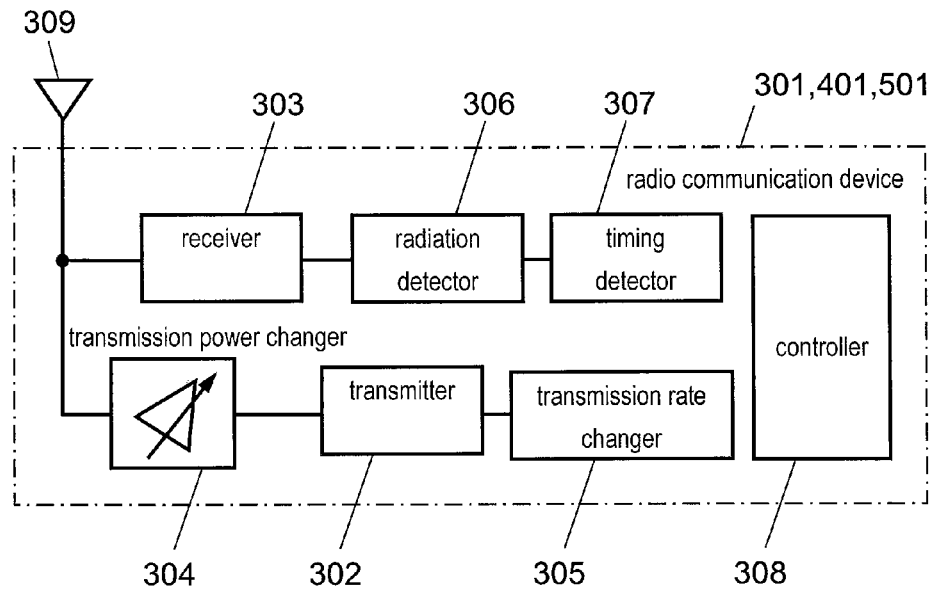
FIG. 1 is a block diagram showing the structure of a radio communication device in accordance with a first exemplary embodiment of the present invention.

FIG. 1 is a block diagram showing the structure of a radio communication device in accordance with the first exemplary embodiment of the present invention. Radio communication device 301 has transmitter 302, receiver 303, transmission power changer 304, transmission rate changer 305, radiation detector 306, timing detector 307, controller 308, and antenna 309.

Radio communication device 301 transmits and receives data. Radio communication device 301 provides data communication at radio frequencies ranging from 2.4 GHz to 2.5 GHz. The communication channels are changeable. Radio communication device 301 transmits or receives data, switching between a normal communication mode and an avoidance communication mode (which will be described later). Radio communication device 301 employs frequency shift keying (FSK) modulation. In the normal communication mode, radio communication device 301 transmits data with a transmission power of 10 mW and at a transmission rate of 250 kbps.

Each functional block of radio communication device 301 is described first. Receiver 303 receives data from antenna 309. Receiving data from receiver 303, radiation detector 306 detects radiation from a microwave oven through the method described later.

Reading changes in radiation detected by radiation detector 306, timing detector 307 detects the timing at which the radiation from the microwave oven stops.

In response to the detected radiation, controller 308 changes the normal communication mode into the avoidance communication mode.

In the avoidance communication mode, transmitter 302 prepares transmission packets so as to satisfy the following relational expressions: $T_1 = T_0/2/M$ and $T_2 = T_0/2$ (where, $T_1$ represents the time required for transmission; $T_2$ represents the cycle of transmission; $T_0$ represents the cycle of an AC power source; and $M \geq 4$). Such prepared transmission packets are transmitted by transmitter 302 so as to be synchronized with the timing of no EMI radiation detected by timing detector 307.

Transmission power changer 304 determines the transmission power of the transmission packets in the avoidance communication mode by multiplying $T_2/T_1$ to the transmission power in the normal communication mode.

Similarly, transmission rate changer 305 determines the transmission rate of the transmission packets in the avoidance communication mode by multiplying $T_2/T_1$ to the transmission rate in the normal communication mode.

Next, the receiving system of radio communication device 301 is described in detail. Receiver 303 processes the data captured at antenna 309. Radiation detector 306 is connected to receiver 303. Radiation detector 306 contains an RSSI (received signal strength indicator) circuit for detecting the power level of a received signal. Receiving EMI radiation from an operating microwave oven, radiation detector 306 detects intensity of the power level and temporal changes thereof. Timing detector 307, which is connected to radiation detector 306, detects a stopping time of the radiation from the microwave oven.

Figure 2:
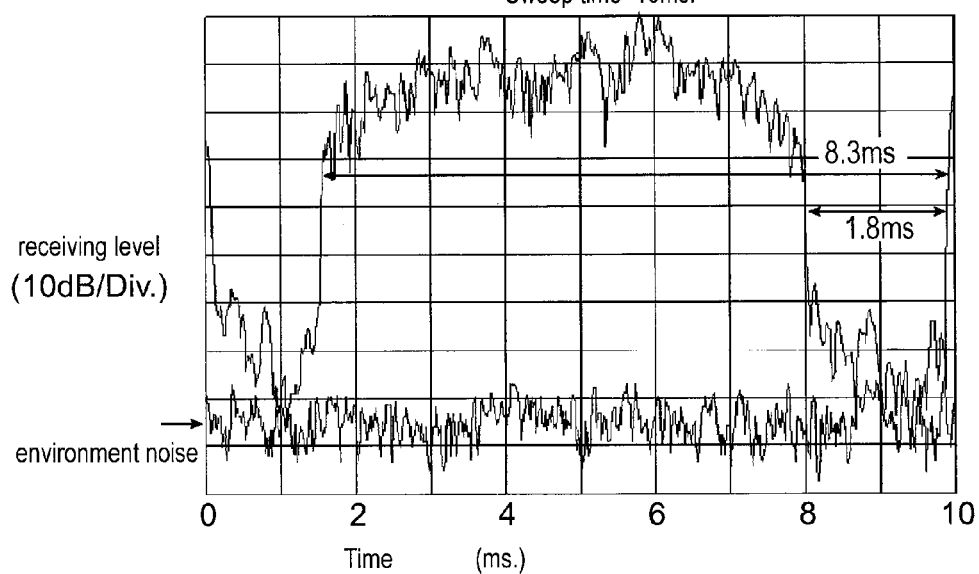
FIG. 2 is a graph showing temporal changes in intensity of radiation waves from a microwave oven in accordance with the first exemplary embodiment.

FIG. 2 is a graph showing temporal changes in intensity of radiation waves from a microwave oven in accordance with the first exemplary embodiment. The graph shows temporal changes in radiation waves with a frequency of 2.46 GHz brought by a microwave oven in operation. The radiation waves are measured by a spectrum analyzer (with a low noise amplifier disposed on the upstream side of the analyzer) at a frequency in the Zero Span mode.

Generally, a microwave oven operates on a commercial power source of 60 Hz (or 50 Hz). In a case of an inverter model, the structure employs inverter switching (at a switching frequency of approx. 20 kHz) for a voltage waveform of 120 Hz obtained by full-wave rectification of 60-Hz AC power source. Through the inverter switching, the radiation waveform periodically passes the zero cross point by $1/120$ sec. (=8.33 ms). The magnetron of a microwave oven periodically stops oscillation at around the zero cross point. In FIG. 2, the graph shows a 1.8-ms break time during which the microwave oven substantially has no radiation. That is, high-frequency signals transmitted from radio communication device 301 in the period of 1.8 ms are received by a receiving device with no adverse effect of radiation from a microwave oven.

In radio communication device 301 in the avoidance communication mode, radiation detector 306 detects intensity of radiation waves shown in FIG. 2, and timing detector 307 generates a timing signal synchronized with the break time of radiation from a microwave oven.

Next, the transmitting system of radio communication device 301 is described in detail. The transmitting system of device 301 has transmitter 302, transmission power changer 304, and transmission rate changer 305. Transmission rate changer 305 changes the transmission rate of the signals to be transmitted from transmitter 302. Transmission power changer 304 amplifies the signals transmitted from transmitter 302. The output of transmission power changer 304 radiates outside from antenna 309. Controller 308 controls the receiving and transmitting systems of radio communication device 301.

As described above, when radiation detector 306 in the receiving system detects EMI radiation from a microwave oven, radio communication device 301 changes the normal communication mode into the avoidance communication mode so as to avoid the radiation effect from the microwave oven.

Hereinafter, the workings of radio communication device 301 in the avoidance communication mode are described. Controller 308 effects control of transmitter 302 in a manner so as to transmit a packet in synchronization with a timing signal generated in timing detector 307. In the avoidance communication mode, transmission rate changer 305 changes the transmission rate to be greater than that in the normal communication mode. Similarly, transmission power changer 304 changes the transmission power to be greater than that in the normal communication mode.

Figure 3:
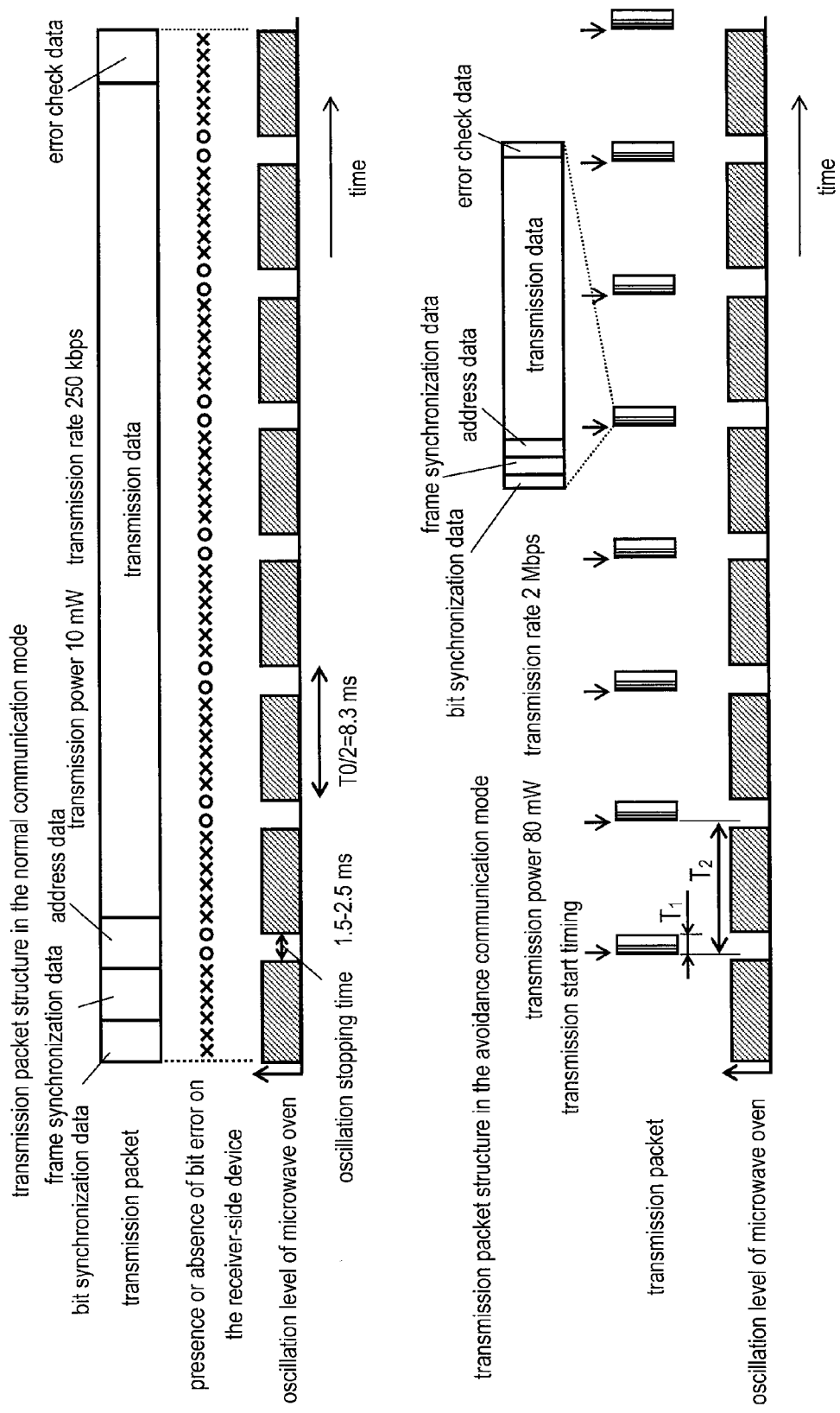
FIG. 3 shows the structure of a transmission packet of the radio communication device in accordance with the first exemplary embodiment.

FIG. 3 shows the structure of a transmission packet of radio communication device 301 in accordance with the first exemplary embodiment. The packet transmitted in the normal communication mode is shown in the upper section of FIG. 3, and the packet transmitted in the avoidance communication mode is shown in the lower section. In the normal communication mode in which no EMI radiation is detected, a transmission packet is transmitted with a transmission power of 10 mW and at a transmission rate of 250 kbps, as described earlier. As shown in the upper section of FIG. 3, the transmission packet contains bit synchronization data, frame synchronization data, address data, transmission data, and error check data.

The length of time for transmitting a packet in the normal communication mode is greater than the break time of oscillation of a microwave oven. Therefore, while a microwave oven is operating, the packets transmitted in the normal communication mode from radio communication device 301 are interfered by EMI radiation of the microwave oven, by which a bit error can occur. The communication interference can significantly decrease the distance between communication devices.

Radio communication device 301 obtains the timing of oscillation stop of a microwave oven from the timing signal generated by timing detector 307. For example, when radiation detector 306 detects EMI radiation that continues on a basis of a typical cycle of $T_0/2$ (=8.33 ms), controller 308 changes the normal communication mode into the avoidance communication mode to avoid the communication interference. In the avoidance communication mode, radio communication device 301 transmits the transmission packets so as to be timed to the oscillation stop.

In the avoidance communication mode, transmitter 302 of device 301 prepares a transmission packet so as to satisfy the following relational expressions: $T_1=T_0/2/M$ and $T_2=T_0/2$ (where, $T_0$ represents the cycle of an AC power source; $M \geq 4$, preferably, $M \geq 8$; $T_1$ represents the time required for transmission, i.e. the time length; and $T_2$ represents the cycle of transmission). Prior to transmission of the packets, transmission power changer 304 determines the transmission power of the packets in the avoidance communication mode by multiplying $T_2/T_1$ to the transmission power in the normal communication mode. Similarly, transmission rate changer 305 determines the transmission rate of the packets in the avoidance communication mode by multiplying $T_2/T_1$ to the transmission rate in the normal communication mode. FIG. 3 shows an example of M=8. In that case, $T_2/T_1=8$ and accordingly, the transmission power and the transmission rate are changed to be 80 mW and 2 Mbps, respectively.

In the avoidance communication mode, if the transmission data is too much to be transmitted within transmission time (time length) $T_1$ for a single packet, transmitter 302 divides the data into a plurality of packets, and repeatedly transmits them by transmission cycle $T_2$.

According to the embodiment, when radio communication device 301 transmits data with a transmission power of 10 mW and at a transmission rate of 250 kbps in the normal communication mode, the transmission power and the transmission rate in the avoidance communication mode are eight times greater than those in the normal communication mode. There is no difference in energy density for one-bit data between the two modes above, by which the transmission distance and an average rate of transmission between the two modes can be maintained nearly the same. According to radio communication device 301 of the present invention, even in the avoidance communication mode for avoiding the effect of EMI radiation from a microwave oven, the device offers a communication distance and a transmission rate nearly the same as those in the normal communication mode. That is, an effective transmission speed has no degradation.

Radio communication device 301 has an average rate of transmission of 10 mW in both the normal communication mode and the avoidance communication mode. In the countries around the world including Japan, each of radio frequency bands has the upper limit of an average transmission power. For example, a frequency band of 2.4 GHz, the upper limit of the average transmission power (in the case having no frequency diffusion) is defined to 10 mW. In the normal communication mode, radio communication device 301 transmits data in a continuous, relatively large packet with a transmission power of 10 mW at a transmission rate of 250 kbps. In contrast, in the avoidance communication mode, device 301 transmits data in a small packet corresponding to one eighth of the time length of transmission cycle $T_2$ with a transmission power of 80 mW at a transmission rate of 1 Mbps. Radio communication device 301 thus offers radio communication within the defined range described above.

Controller 308 of radio communication device 301, which is formed of a microcomputer, controls receiver 303, radiation detector 306, timing detector 307, transmission power changer 304, transmitter 302, and transmission rate changer 305.

Figure 4:
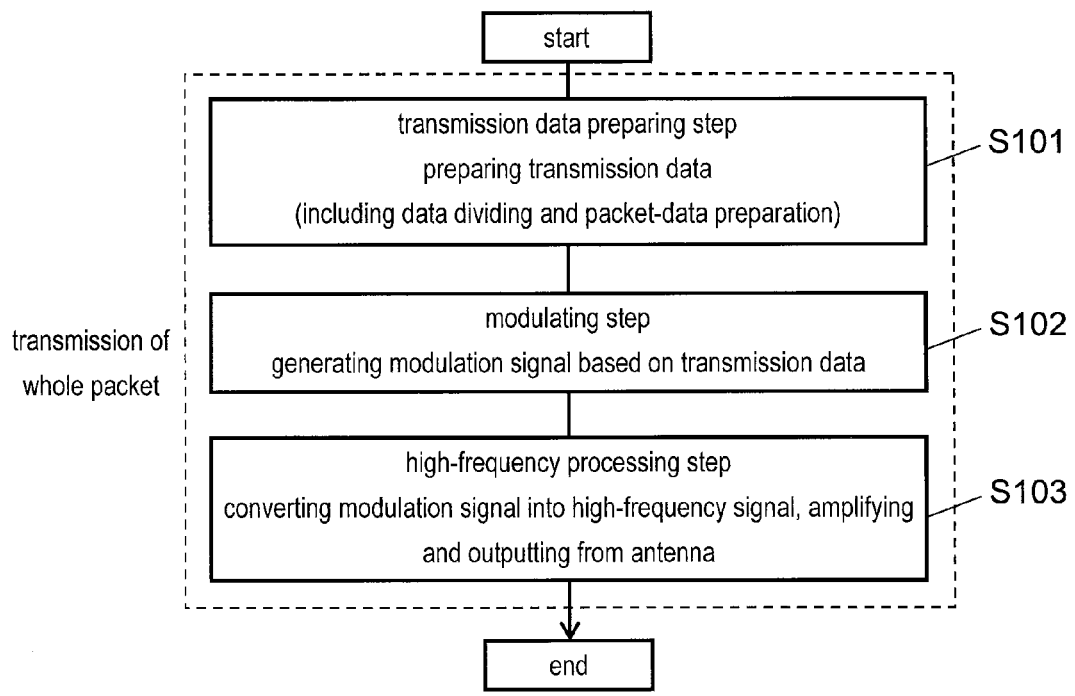
FIG. 4 is a flowchart illustrating the transmission procedures in the normal communication mode of the radio communication device in accordance with the first exemplary embodiment.

FIG. 4 is a flowchart illustrating the transmission procedures in the normal communication mode of radio communication device 301 in accordance with the first exemplary embodiment. When the transmission procedures start, transmitter 302 prepares transmission data shown in the upper section of FIG. 3 (in step S101 as the transmission data preparing step) and generates a modulation signal according to the transmission data (in step S102 as the modulating step). Further, transmitter 302 converts the modulation signal into a high-frequency signal through a high-frequency process and then amplifies the high-frequency signal to obtain a transmission signal. Such obtained transmission signal radiates outside through antenna 309 (in step S103 as the high-frequency processing step).

Figure 5:
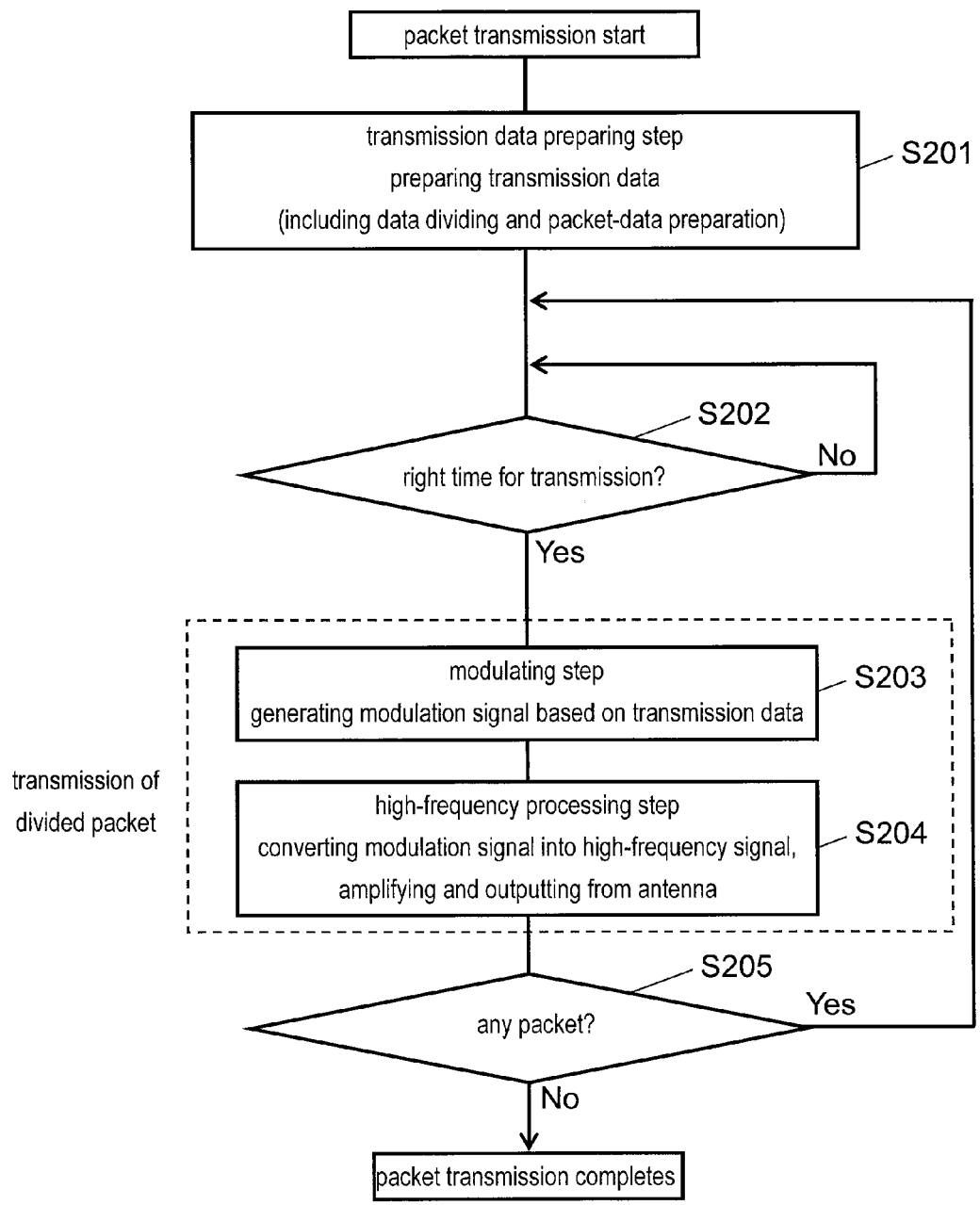
FIG. 5 is a flowchart illustrating the transmission procedures in the avoidance communication mode of the radio communication device in accordance with the first exemplary embodiment.

FIG. 5 is a flowchart illustrating the transmission procedures in the avoidance communication mode of radio communication device 301 in accordance with the first exemplary embodiment. When the transmission procedures start, transmitter 302 prepares transmission data shown in the lower section of FIG. 3 (in step S201 as the transmission data preparing step). In step S201, transmitter 302 prepares a transmission packet in a manner that transmission data is divided into the size corresponding to the length of transmission time (time length) $T_1$. The divided transmission packet—also referred to as a divided packet—is transmitted with time length $T_1$ at a timing of oscillation stop of a microwave oven.

After the transmission data is prepared, controller 308 determines whether it is the right time for transmission or not (in step S202). Controller 308 determines the timing of transmission according to the timing signal detected by timing detector 307. If controller 308 determines that it is the right time to transmit data, transmitter 302 generates a modulation signal according to the transmission data (in step S203 as the modulation step). Further, transmitter 302 converts the modulation signal into a high-frequency signal and then amplifies the high-frequency signal to obtain a transmission signal.

Such obtained transmission signal radiates outside through antenna 309 (in step S204 as the high-frequency processing step).

Next, controller 308 determines whether all the divided packets have been transmitted or not (in step S205). If any packet is left, the procedure goes back to step S202 where controller 308 determines whether it is the right time for transmission or not. When determining that it is the right time to transmit data, controller 308 requests transmitter 302 to transmit the remainder of the divided packets. As is shown in step S203 and step S204, transmitter 302 repeatedly transmits the packets. Each time the transmission of a divided packet is completed, controller 308 determines whether any divided packet is left or not. If controller 308 determines that there is no remainder, the packet transmission procedure is completed (in step S205).

In the structure of the embodiment, controller 308 changes the normal communication mode into the avoidance communication mode according to periodical change in power level detected by radiation detector 306, but it is not limited thereto. In response to periodic or piecemeal occurrence of a bit error of received and modulated data, radiation detector 306 may determine the presence of radiation effect from a microwave oven. Specifically, radiation detector 306 determines the presence of radiation when received data periodically has a bit error by a period of $T_0/2$. Similarly, timing detector 307 may detect a stopping time of radiation from timing of no occurrence of a bit error of the received data. Through the method above, EMI radiation of a microwave oven can be detected, so that the radio communication device can continues data communication without an adverse effect of EMI radiation from the microwave oven.

As another possibility, radiation detector 306 may determine the presence of EMI radiation when receiving power exhibits a periodic change at cycle $T_0/2$ during the period with no transmission from a radio communication device on the receiver side. In that case, timing detector 307 can detect the stopping time of the EMI radiation according to the timing of no bit-error in the received data. Through the method above, EMI radiation of a microwave oven can be detected in advance, so that the radio communication device can continues data communication without an adverse effect of EMI radiation from the microwave oven.

Besides, controller 308 may determine the presence or absence of EMI radiation according to information representing that the microwave oven is in operation (, where the information is contained in the transmission packet transmitted from the counterpart device that communicates with device 301).

Although the exemplary embodiment shows an example where transmission time (time length) $T_1$ is obtained from the following equation: $T_1=T_0/2/M$ (where, M=8), it is not limited thereto. The value of M takes any numbers (including decimal numbers) as long as M≥4.

The exemplary embodiment introduces a structure where controller 308 is formed of a microcomputer, but it is not limited thereto. Controller 308 may be formed of a digital logic circuit and/or an analog circuit.

Second Exemplary Embodiment

Figure 6:
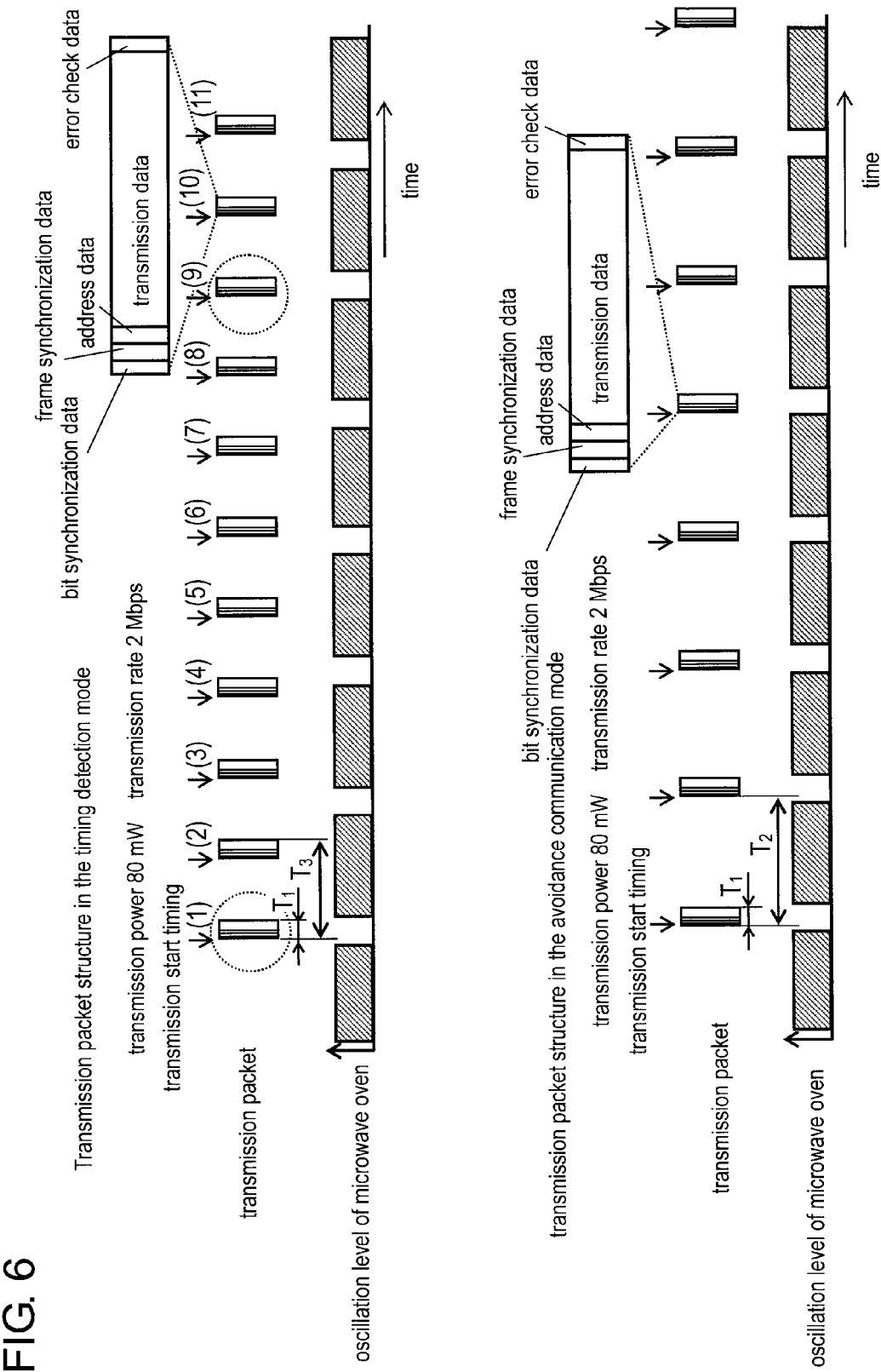
FIG. 6 shows the structure of a transmission packet of the radio communication device in accordance with a second exemplary embodiment.

The structure of the second exemplary embodiment is described. FIG. 6 shows the structure of a transmission packet of radio communication device 401 in accordance with the second exemplary embodiment. Radio communication device 401 has a structure nearly the same—except for the workings of timing detector 307—as that of radio communication device 301 of the first exemplary embodiment shown in FIG. 1. Instead of the normal communication mode described in the first embodiment, radio communication device 401 has a timing detection mode for timing detection. In the timing detection mode, radio communication device 401 transmits a transmission packet with transmission cycle $T_3$ obtained by the following calculation: $T_3=T_0/2+T_4$ (where, $T_4$ represents a shift time and $T_4$ is determined so as to satisfy the inequality: $-T_0/2 \leq T4 \leq T_0/2$). Having a structure the same as the divided packet in the avoidance communication mode, the transmission packet in the timing detection mode is transmitted with transmission time (time length) $T_1$.

The example of the timing detection mode (shown in the upper section of FIG. 6) employs shift time $T_4$ obtained by the equation: $T_4=-T_0/2/8$. Such determined shift time $T_4$ is slightly shorter in length than transmission cycle $T_2$. Due to the difference in length between time $T_4$ and cycle $T_2$, some packets are transmitted while a microwave oven is in operation and therefore affected by EMI radiation from the microwave oven. In the example of FIG. 6, the packets marked with a dotted circle, i.e. the first and the ninth packets will be received by radio communication device 501 on the receiver side with no effect of EMI radiation from the microwave oven.

Suppose that radio communication device 501 on the receiver side has a structure and workings similar to those of radio communication devices 301 and 401. In that case, radio communication device 501 knows that the first and the ninth packets have been received with no error from the data contained in each packet. At the same time, device 501 detects bit errors in the second through the eighth, the tenth, and the eleventh packets by an error detection mark contained in the data. Detecting the condition of the received packets, timing detector 307 of radio communication device 501 on the receiver side generates a timing signal, based on the timing of the first and the ninth packets, so as to show the right time for transmitting/receiving packets.

Radio communication device 501 returns a response packet based on the timing signal to device 401, by which device 401 knows that the transmission timing of the first and the ninth packet has no effect of radiation. In this way, timing detector 307 of radio communication device 401 generates a timing signal.

In response to the timing signal generated by timing detector 307, controller 308 of radio communication device 401 changes the timing detection mode into the avoidance communication mode (shown in the lower section of FIG. 6). The avoidance communication mode of the embodiment is similar to that described in the first embodiment.

In the first embodiment, radio communication device 301 has to monitor and detect the presence or absence of radiation effect from a microwave oven, while operating in the normal communication mode. Unlike radio communication device 301 of the first embodiment, radio communication device 401 of the embodiment employs the timing detection mode. The timing detection mode works similar to the avoidance communication mode except for difference in transmission cycle of a divided packet by shift time $T_4$.

As described above, radio communication device 401 usually operates in the timing detection mode. In response to information on occurrence of a bit error from device 501 on the receiver side, radiation detector 306 determines that the microwave oven starts the operation and timing detector 307 carries out timing detection to generate a timing signal. On completion of generation of the timing signal, device 401 changes the timing detection mode into the avoidance communication mode. With the structure above, radio communication device 401 of the embodiment consistently offers effective communications regardless of whether a microwave oven is in operation or not.

Suppose that radio communication device 401 constantly operates in the avoidance communication mode. In that case, device 401 maintains the state in which communication has no effect of radiation after the microwave oven stops the operation. Operating radio communication device 401 in the avoidance communication mode for a long time does not allow the device to compensate an error in a timing signal. A difference between the cycle of a commercial power source and the reference signal (e.g. crystal oscillator) may shift the generation of a timing signal from the right time (synchronized with the cycle of the commercial power source). If a microwave oven starts the operation under the state where a timing signal is generated at an improper timing, the transmission timing can overlap with the radiation timing. In such a case, the divided packets cannot be received on the receiver side and communications can be cut off due to the receiving failure.

To avoid the problem above, radio communication device 401 should preferably switches the operation between the timing detection mode and the avoidance communication mode. That is, device 401 usually operates in the timing detection mode. When detecting the radiation effect from a microwave oven, device 401 changes the mode into the avoidance communication mode. After a predetermined time has passed, the device should preferably be back to the timing detection mode so as to monitor the presence or absence of the radiation effect from the microwave oven.

As mentioned earlier, a response packet transmitted from device 501 on the receiver side contains information on bit errors. If radiation detector 306 detects occurrence of a bit error on the receiver side from the response packet, radio communication device 401 may control the transmission timing as follows. That is, controller 308 of device 401 effects control of transmitter 302 in a manner so as to determine the timing of the next transmission different from transmission cycle $T_2$. After that, transmitter 302 transmits the packets with transmission time $T_1$ and with transmission cycle $T_2$. Each time a bit error occurs on the receiver side, the timing of transmission is determined to have a shift from transmission cycle $T_2$, allowing the transmission timing to be timed with the stopping time of the radiation.

Although the example of the embodiment employs shift time $T_4$ obtained from the equation: $T_4 = -T_0/2/8$, it is not limited thereto. Shift time $T_4$ may be other values as long as it satisfies the inequality expression: $-T_0/2 \leq T_4 \leq T_0/2$.

Third Exemplary Embodiment

The first and the second exemplary embodiments explain an example where radio communication device 401 communicates with radio communication device 501 on the receiver side with no effect of radiation from a microwave oven. The structure shown in the third embodiment is a radio communication system containing a microwave oven (as a radio communication device that operates on a commercial power source) and a radio communication device, such as a radio communication terminal equipment and a radio remote control (as a radio communication device that operates on a battery power source). In the structure of the embodiment, the effect similar to that obtained by the previous two embodiments is expected.

Figure 7:
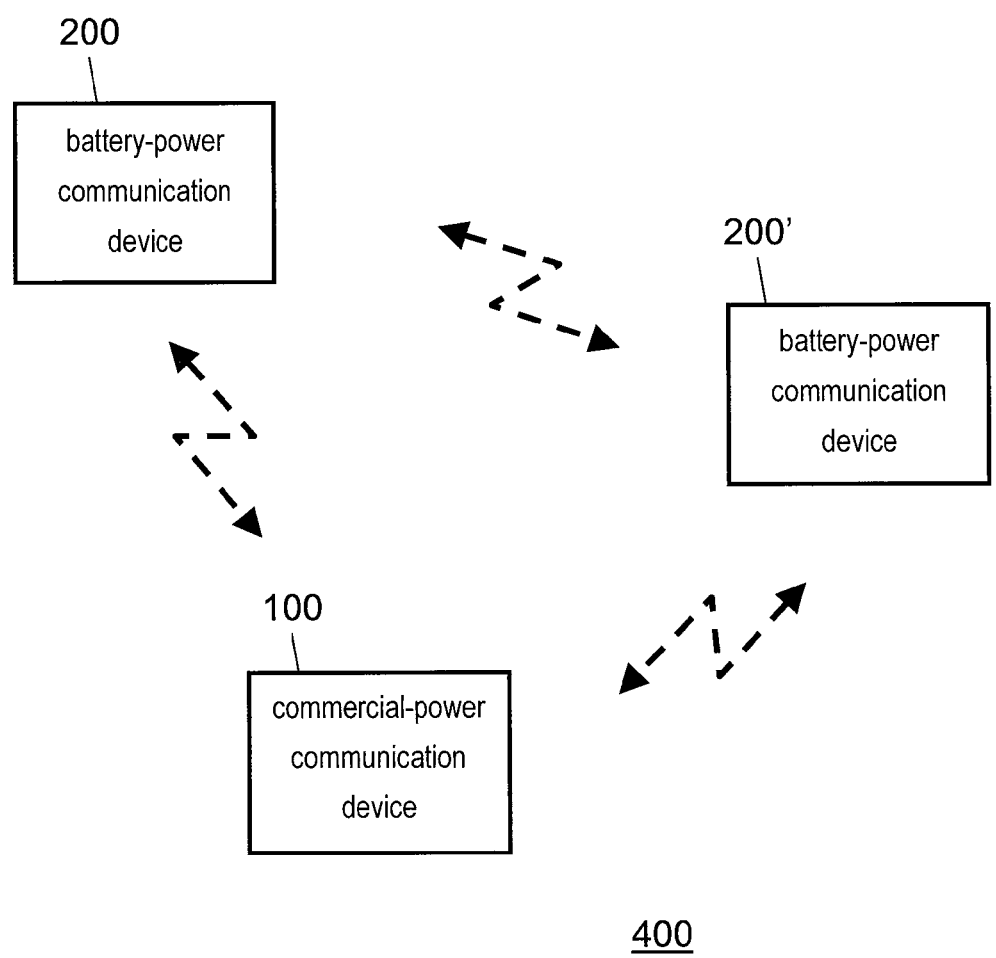
FIG. 7 schematically shows the radio communication system in accordance with a third exemplary embodiment.

FIG. 7 schematically shows radio communication system 400 in accordance with the third exemplary embodiment. Radio communication system 400 contains radio communication device 100 operating on a commercial power source and radio communication devices 200, 200' operating on a battery power source.

Radio communication device 100 operating on a commercial power source (hereinafter, commercial-power communication device 100) is, for example, a microwave oven that has an effect on radio communication functions in the IMS band (i.e., the 2.4-GHz band).

Radio communication device 200 operating on a battery power source (hereinafter, battery-power communication device 200) is, for example, radio communication terminal equipment and a radio remote control that use the radio frequencies in the IMS band. Battery-power communication device 200 communicates not only with another battery-power communication device 200' but also with commercial-power communication device 100.

Figure 8:
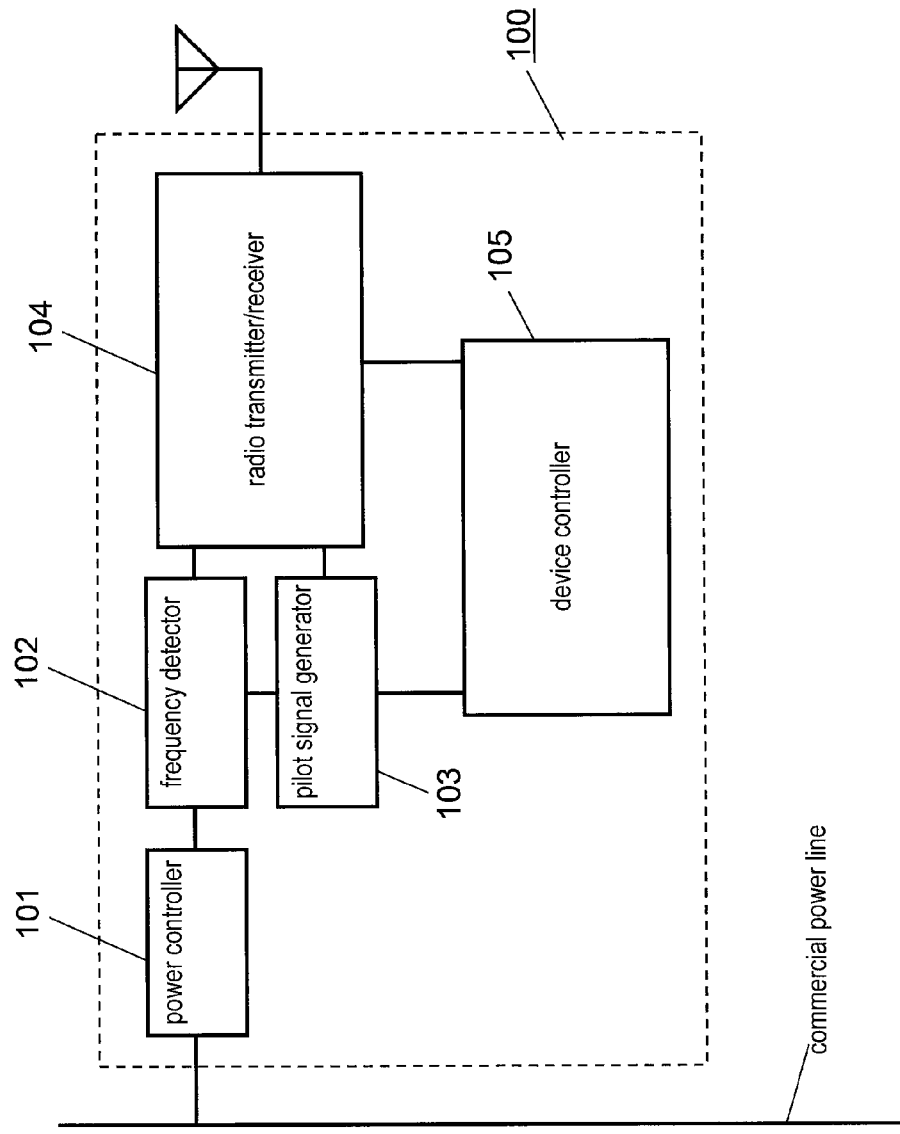
FIG. 8 is a block diagram showing a structure of a radio communication device that operates on a commercial power source in accordance with the third exemplary embodiment.

FIG. 8 is a block diagram showing a structure of commercial-power communication device 100 in accordance with the third exemplary embodiment. Commercial-power communication device 100 has power controller 101, frequency detector 102, pilot signal generator 103, radio transmitter/receiver 104, and device controller 105.

Figure 9:
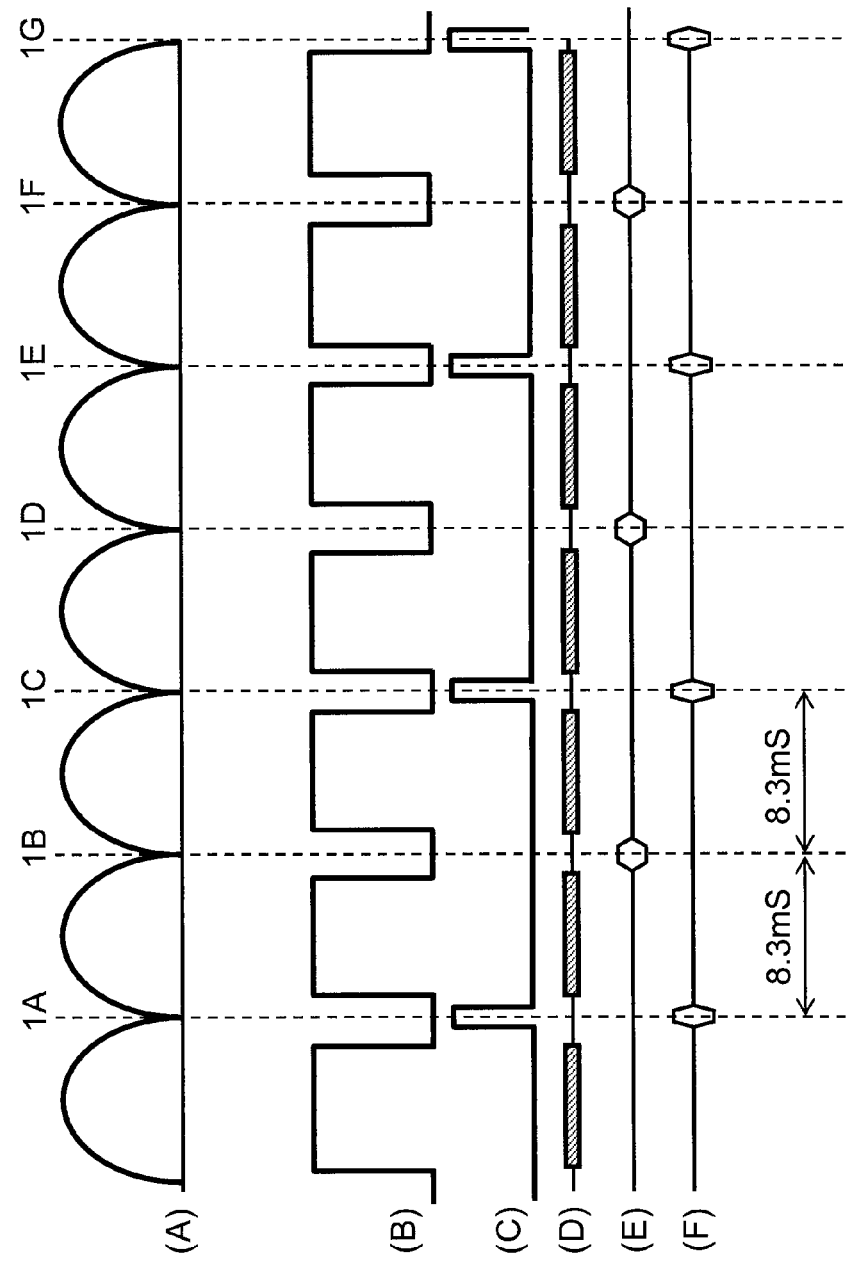
FIG. 9 illustrates the workings of the radio communication device that operates on a commercial power source in accordance with the third exemplary embodiment.

Power controller 101 rectifies the commercial AC power fed from a commercial power line and increases the voltage of the rectified AC power to obtain DC high voltage. FIG. 9 illustrates the workings of commercial-power communication device 100 in accordance with the third exemplary embodiment. Waveform (A) of FIG. 9 shows a signal waveform obtained by full-wave rectifying a commercial AC power. Waveform (B) is the voltage to be applied to the anode of the magnetron, which is obtained by increasing the voltage shown by waveform (A), rectifying it, and then removing a ripple component therefrom. The anode voltage of waveform (B) of FIG. 9 is thus obtained through the process above. Power controller 101 outputs the voltage to frequency detector 102 and pilot signal generator 103. The radio wave having waveform (B) fed from commercial-power communication device 100 adversely affects radio communication of battery-power communication device 200 used in the periphery of device 100.

DC high voltage is applied to the magnetron to output high-frequency high power. The DC high voltage is obtained by increasing the voltage of a commercial AC power by a step-up transformer and rectifying it, as described above. Besides, the DC high voltage can be obtained by the following procedure that is different from above in processing order; that is, rectifying the commercial AC power, providing the rectified voltage with inverter switching, increasing the voltage, and rectifying it. A commercial AC power is formed of a sine wave, and therefore the area in which the polarity reverses, i.e., around the zero cross point and the periphery has a low voltage. Waveform (B) of FIG. 9 can be obtained by either way of above.

Monitoring the anode voltage fed from power controller 101, frequency detector 102 detects a zero-volt (ZV) timing that repeats on a periodic basis. In the example of FIG. 9, the ZV timing is detected at each point marked with dotted line (i.e., points 1A, 1B, 1C, 1D, 1E, 1F, and 1G), and the interval between each point is a cycle. In a case where a commercial AC power source has a frequency of 60 Hz, the cycle obtained from the power line is 8.3 ms.

According to the ZV timing and the cycle of the anode voltage detected by frequency detector 102, pilot signal generator 103 generates a pilot signal by a period being equal to the integral multiple of the cycle, and outputs the signal to radio transmitter/receiver 104. The pilot signal fed from pilot signal generator 103 has a waveform shown by waveform (C)

of FIG. 9. In the example of FIG. 9, the pilot signal has a cycle two times longer than that of the ZV timing, but it is not limited thereto. In terms of time accuracy, pilot signal generator 102 may generate the pilot signal at approx. 100 times greater than the cycle of the ZV timing. Increasing the output time interval contributes to reduced power consumption.

Generally, waveform (B) of FIG. 9 as the waveform fed from commercial-power communication device 100 has a propagation distance ranging from 2 m to 3 m. The propagation distance of the pilot signal should be at least 2-3 m, preferably should be around 10 m so as to reach battery-power communication devices 200 located in the vicinity.

Radio transmitter/receiver 104 communicates with battery-power communication device 200 located in the periphery of device 100. Specifically, radio transmitter/receiver 104 transmits a pilot signal at a timing of timing chart (F) at the bottom of FIG. 9, and transmits and receives a data signal at a timing of timing chart (E).

Power controller 105 prepares a data signal to be transmitted to battery-power communication device 200. At the same time, power controller 105 analyzes a data signal received from battery-power communication device 200. If the data signal has a control instruction for commercial-power communication device 100, power controller 105 controls device 100 according to the instruction.

A magnetron operates on a rated operating voltage as high as several thousand volts and generates high-frequency high power. When commercial-power communication device 100 is a microwave oven, a KW-class power input is needed for the magnetron. In the periphery of the zero cross point where energy supply is not sufficient, the scarce electricity cannot operate the magnetron. That is, the magnetron oscillates in a period where the anode voltage is kept at a sufficient level, whereas the magnetron stops the oscillation at the zero cross point and the periphery due to decrease in voltage.

With a constant supply of the heater electric power of the magnetron and the anode voltage, the output from the magnetron has a stable spectrum to a specific frequency band in the ISM band; in reality, application of energy varies by the cycle of a commercial AC power. Observations suggest that the spectrum of high-frequency power generated by the magnetron has variations across a relatively broad range in the ISM band due to the influence of the temporal change in application of energy.

Observations suggest that the spectrum of high frequency output generated by the magnetron covers a broad range in the ISM band.

If the ISM band has a frequency band that is free from the influence of the spectrum of output from the magnetron, a remote control that operates in the frequency band above provides radio communication with stability and with no adverse effect of the magnetron. However, the observations show that the output spectrum of the magnetron covers a broad range, with little space left in the ISM band.

After increasing and rectifying the voltage, ripples of the voltage can be smoothed by a capacitor. However, when the magnetron has a large consumption current, the smoothing effect by a capacitor is not expected. When the magnetron finishes up electric charge of the capacitor, the magnetron no longer obtains the operating voltage, resulting in operation stop. As is shown in FIG. 9 (B), the magnetron stops the operation around the zero cross point in a commercial AC power.

That is, as is shown in FIG. 9 (D), a device that operates on a commercial AC power switches between the operating state (shown by a shaded area) and the non-operating state in synchronization with the frequency of a commercial AC power.

That is, the devices working on the same commercial AC power in the customer's premise repeat the operating state and the non-operating state, as described above. During the non-operating state, a device whose large output of high-frequency power affects the ISM band, such as a microwave oven, is not in operation.

Battery-power communication device 200 of the embodiment performs radio communication in the ISM band so as to be timed with the non-operating state of a microwave oven, avoiding the adverse effect from the microwave oven and enhancing the efficiency in communication.

Figure 10:
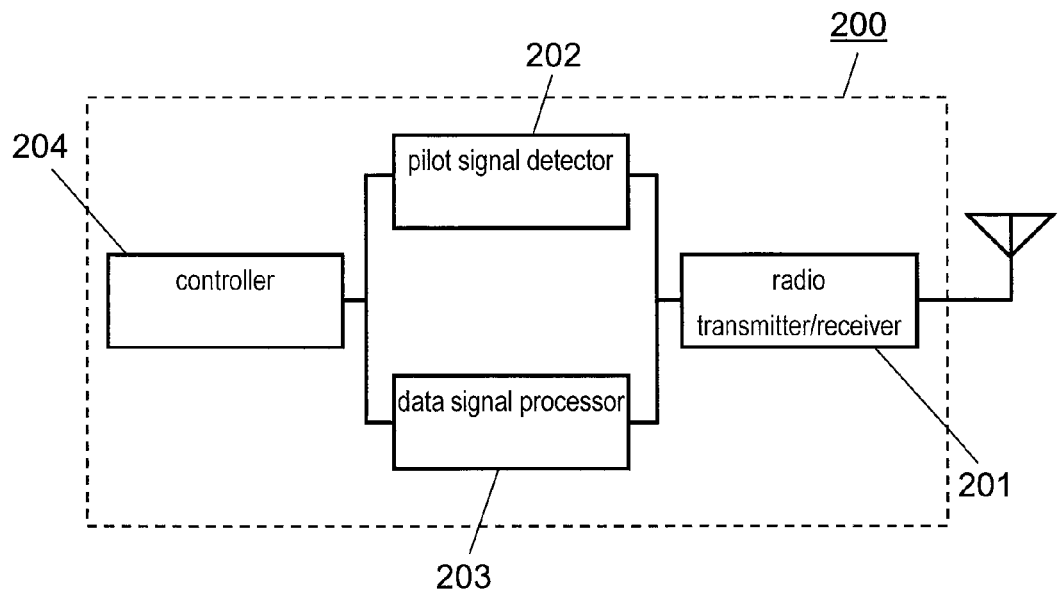
FIG. 10 is a block diagram showing a structure of a radio communication device that operates on a battery power source in accordance with the third exemplary embodiment.

FIG. 10 is a block diagram showing a structure of battery-power communication device 200 in accordance with the third exemplary embodiment. Battery-power communication device 200 has radio transmitter/receiver 201, pilot signal detector 202, data signal processor 203, and controller 204. Battery-power communication device 200 operates on a battery power source (not shown in FIG. 10).

Radio transmitter/receiver 201 exchanges a data signal with commercial-power communication device 100 or another battery-power communication device 200 located in the vicinity.

Pilot signal detector 202 determines whether the data signal received by radio transmitter/receiver 201 contains a pilot signal or not. Pilot signal detector 202 thus detects a pilot signal.

Data signal processor 203 determines whether the data signal received by radio transmitter/receiver 201 contains a control instruction or not. When a control instruction is contained in the data signal, data signal processor 203 outputs it to controller 204.

Controller 204 controls battery-power communication device 200 according to a control instruction received from data signal processor 203. At the same time, controller 204 generates a data signal to be transmitted to commercial-power communication device 100 and another battery-power communication device 200 located in the vicinity.

Figure 11:
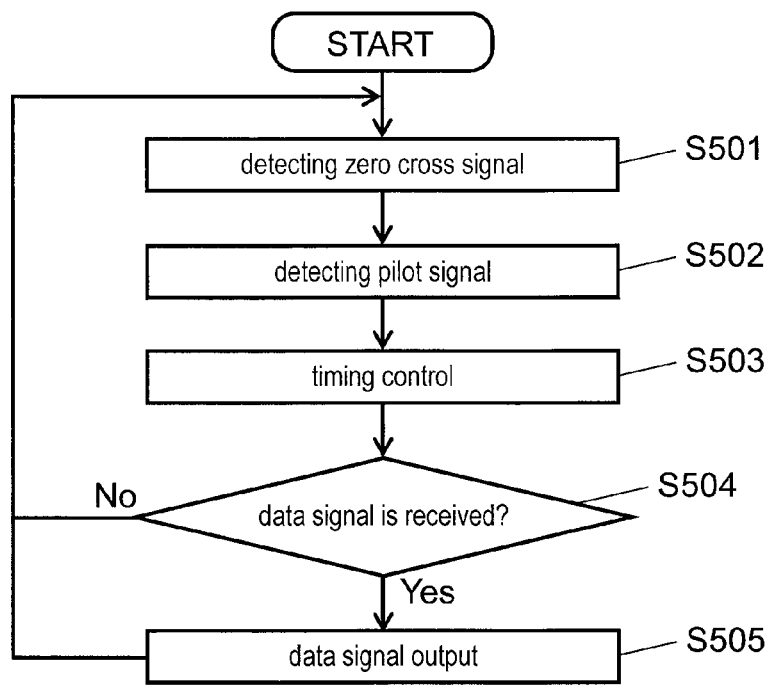
FIG. 11 is a flowchart illustrating the workings of the radio communication device that operates on a commercial power source in accordance with the third exemplary embodiment.

FIG. 11 is a flowchart illustrating the workings of commercial-power communication device 100 in accordance with the third exemplary embodiment. In step S501, frequency detector 102 detects a zero cross signal from the waveform of FIG. 9 (B) fed from power controller 101. The zero cross signal is periodically detected at the dotted lines (line 1A through line 1G) in FIG. 9.

In step S502, receiving the waveform fed from power controller 101 and the zero cross signal fed from frequency detector 102, pilot signal generator 103 generates a pilot signal and outputs it to radio transmitter/receiver 104 at a timing shown by dotted lines 1A through 1G. The pilot signal is transmitted to battery-power communication device 200 located in the periphery of device 100.

In step S503, device controller 105 carries out timing control so that the data signal is periodically transmitted (or received) with an interval of 8.3 ms from transmission of a pilot signal.

In step S504, radio transmitter/receiver 104 performs carrier sensing to know whether a data signal is received or not. If the data signal is for device 100, radio transmitter/receiver 104 outputs the signal to device controller 105 in step S505. Device controller 105 controls device 100 according to the control instruction contained in the signal.

Step S503 and step S504 show the receiving procedures of a data signal. It will be understood that a data signal can be also transmitted with an interval of 8.3 ms from transmission of a pilot signal.

Commercial-power communication devices can obtain a zero cross signal from the commercial power, whereas battery-power communication devices cannot obtain the signal. According to the structure of the embodiment, the commercial-power communication device transmits a pilot signal to the battery-power communication device. Receiving the pilot signal, the battery-power communication device obtains a zero cross signal from the pilot signal, allowing data to be transmitted and received at a timing with high success rate. Thus, the structure enhances reliability in radio communication.

Figure 12:
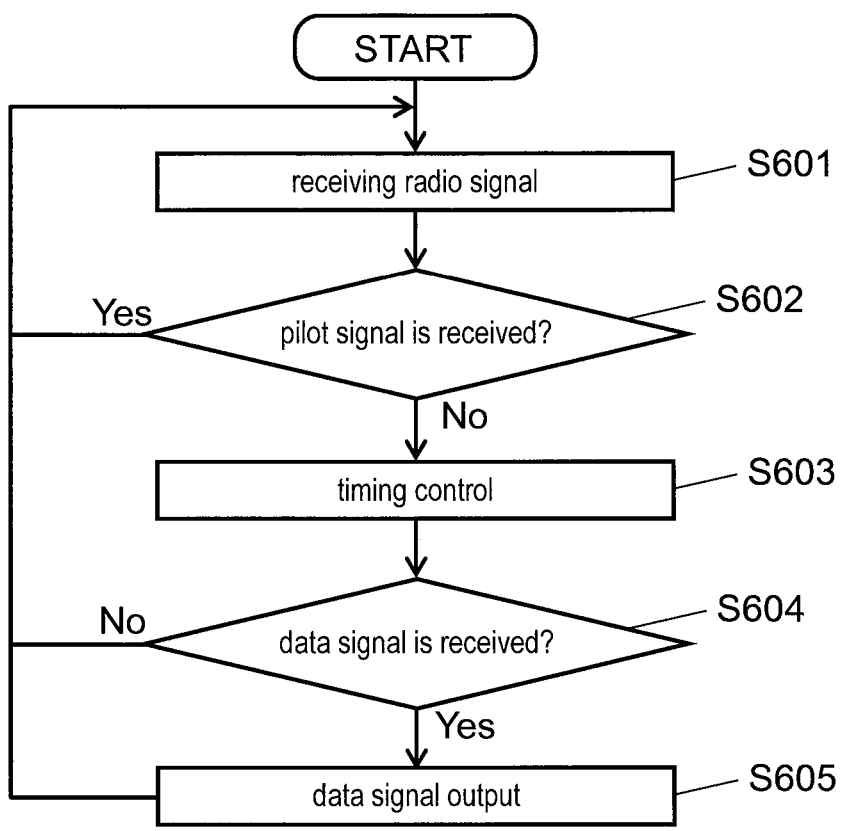
FIG. 12 is a flowchart illustrating the workings of the radio communication device that operates on a battery power source in accordance with the third exemplary embodiment.

FIG. 12 is a flowchart illustrating the workings of battery-power communication device 200 in accordance with the third exemplary embodiment. In step S601, radio transmitter/receiver 201 receives a data signal from commercial-power communication device 100 or another battery-power communication device 200. In step S602, pilot signal detector 202 determines whether the received data signal is a pilot signal or not.

If the received signal is not a pilot signal, the procedure goes back to step S601 and radio transmitter/receiver 201 repeatedly receives a data signal until the received signal is determined to be a pilot signal in step S602. If the received signal is a pilot signal, timing control is performed to wait a cycle of 8.3 ms since the moment at which a pilot signal was received. The timing control in step S603 allows radio transmitter/receiver 201 to aim the exact timing of data communication.

In step S604, device 200 determines whether a data signal representing data entry by the user is received or not between step S601 and step S603. If a data signal has been received, the data signal is transmitted to controller 204 in step S605. Radio transmitter/receiver 201 transmits the data signal to commercial-power communication device 100 or battery-power communication device 200 located in the vicinity. At that time, the data signal is transmitted with a cycle of 8.3 ms since the moment at which a pilot signal was received.

If a data signal is not found in step S604, the procedure goes back to pilot-signal search in step S601.

As battery-power communication device 200 performs carrier sensing for a predetermined period of time each time the device is powered on, the pilot signal fed from the commercial-power communication device is received without fault. The procedures of FIG. 12 are thus carried out with no problem.

Figure 13:
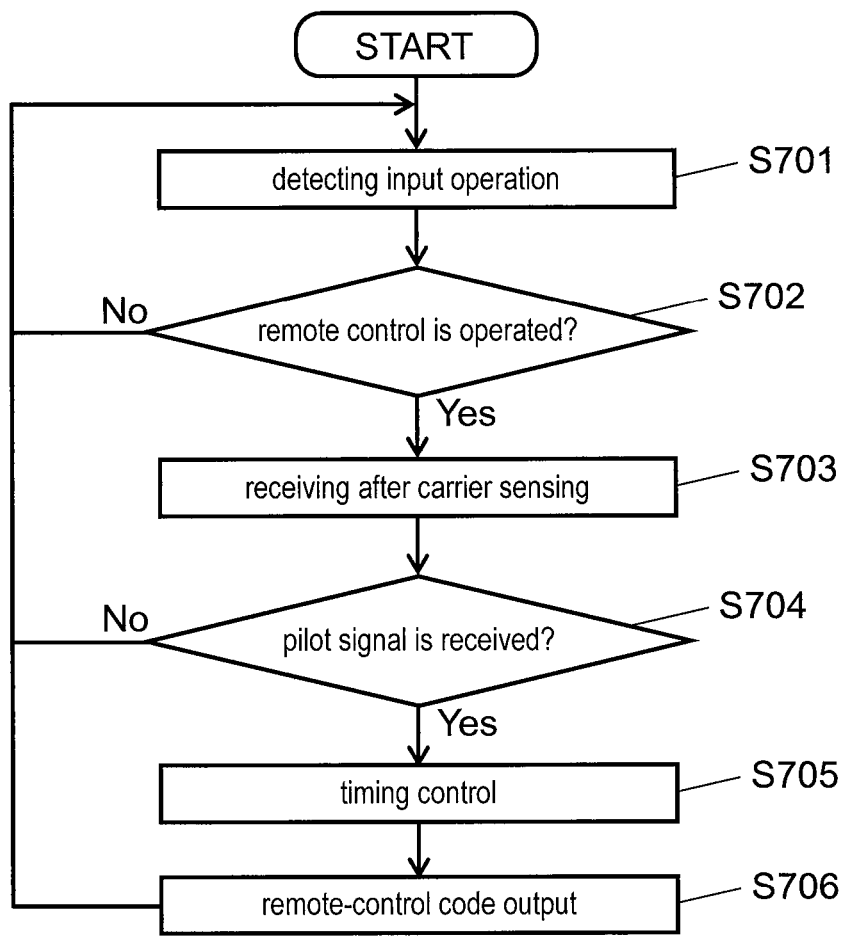
FIG. 13 is a flowchart illustrating the workings of a radio remote control that serves as a radio communication device operating on a battery power source in accordance with the third exemplary embodiment.

FIG. 13 is a flowchart illustrating the workings of a radio remote control that serves as battery-power communication device 200 in accordance with the third exemplary embodiment.

The operation timing of a remote control depends on a device to be controlled. Taking examples of an air conditioner, a television, and a video recorder where operation is generally done by a remote control, the operation timing is discussed below. For example, in the case of an air conditioner, the frequency in use of the remote control is relatively low other than power on/off and temperature control. That is, the remote control has a long interval between operations. In contrast, in the case of a television and a video recorder, the user frequently uses the remote control for program recording or frame-by-frame playback in video editing. The frequency in use of the remote control is high. In other words, the remote control has a short interval between operations. However, compared to the incoming timing of a ZV (zero volt) signal, a human operation interval has much more period of time—even in the operation of a video recorder with a short interval, it takes approx. 0.3 sec. Therefore, the pilot-signal search is not necessarily performed before the key operation of the remote control by the user.

In step S701, the remote control keeps monitoring of data entry by the user until the user operates a button on the control panel. If data entry is detected in step S701 (step S702), carrier sensing is performed in step S703. If a pilot signal is detected in step S704, timing control is performed in step S705 so as to wait a cycle of 8.3 ms since the moment at which a pilot signal was detected. In step S706, the remote-control signal entered by the user is transmitted.

As illustrated in FIG. 9, the signal is transmitted in the period during which a microwave oven stops high-frequency output. A predetermined device controlled by a remote control transmits a pilot signal synchronized with the cycle to the remote control. Receiving the pilot signal, the controller of the remote control waits a predetermined time before outputting the remote control signal. The communication method above allows the remote control signal to be transmitted or received with no adverse effect of high-frequency high power of a microwave oven.

To find no detection period of radio waves, performing full-time carrier sensing can be another possibility. Like the method earlier, the full-time carrier sensing offers reliable radio communication. However, the full-time carrier sensing increases the time for receiving data after all, which increases consumption of the battery, i.e., shortening battery life.

According to the structure of the embodiment, a pilot signal and a remote control signal are exchanged at a predetermined cycle. This allows the power-on state of a battery-power communication device to be timed with the cycle, which contributes to decreased battery consumption, that is, contributes to remarkably extended battery life.

Fourth Exemplary Embodiment

In the structure of the third exemplary embodiment where commercial-power communication device 100 transmits a pilot signal, when the structure contains device 100 more than one in number, a problem arises—which device should transmit the pilot signal.

Selecting the pilot-signal transmitter from two-or-more devices 100 by user's operation is not practical in terms of consuming time and effort. Preferably, the pilot-signal transmitter should be determined on the side of commercial-power communication devices 100.

The fourth exemplary embodiment introduces a procedure of determining the pilot-signal transmitter in two-or-more communication devices 100.

Suppose that commercial-power communication device 100 and battery-power communication device 200 has established a network and, out of two-or-more devices 100, a certain one is determined as the pilot-signal transmitter. When another commercial-power communication device 100 is newly added to the network, the additional device waits for a pilot signal from device 100 that serves as the pilot-signal transmitter. Once the pilot signal is received, the additional device has no output of pilot signals after that. In this way, the pilot-signal transmitter is defined to one and only device in the network.

However, in a case of a newly built house or when the power comes back on after blackout (for example, when the molded case circuit breaker is reset after it blew), the power is distributed to all of the previously disposed devices of commercial-power communication device 100 and battery-power communication device 200. In the conditions above, devices 100 cannot determine which one should be the pilot-signal transmitter.

Each of commercial-power communication device 100 carries out pilot-signal search for a first predetermined period of time (e.g. for three cycles; specifically, for 24 ms in the area having a voltage cycle of commercial AC power of 60 Hz, and for 30 ms in the area having a voltage cycle of 50 Hz). If device 100 has no detection of a pilot signal within the period of time above, the device waits for a pilot signal for a second predetermined period of time (e.g. for 50 cycles; specifically, for 415 ms in the area having a voltage cycle of commercial AC power of 60 Hz, and for 500 ms in the area having a voltage cycle of 50 Hz). After that, device 100 further waits for a pilot signal for a period of time (calculated by adding a waiting time specifically determined to each commercial-power communication device to a waiting time determined by a random number generator) before next pilot-signal search. Receiving no pilot signal in spite of the repeated waiting time allows the device itself to determine as the pilot-signal transmitter with the first-order priority among two-or-more commercial-power communication devices 100.

The setting of the waiting time for each device 100 can be controlled as follows. That is, the device with the shortest waiting time is to have the first-order priority to the pilot-signal transmitter. For example, when the television is intended to be the controller of display control, the waiting time of the television is determined to be the shortest. Having the first-order priority, the television outputs a pilot signal when the power comes back on after blackout or at the start of operation.

When there are devices with a same order of priority in one house (for example, two televisions in one house), pilot signals fed from each device collide with each other. According to the embodiment, each of devices 100 has a waiting time determined by the random number generator so as to avoid the collision.

Figure 14:
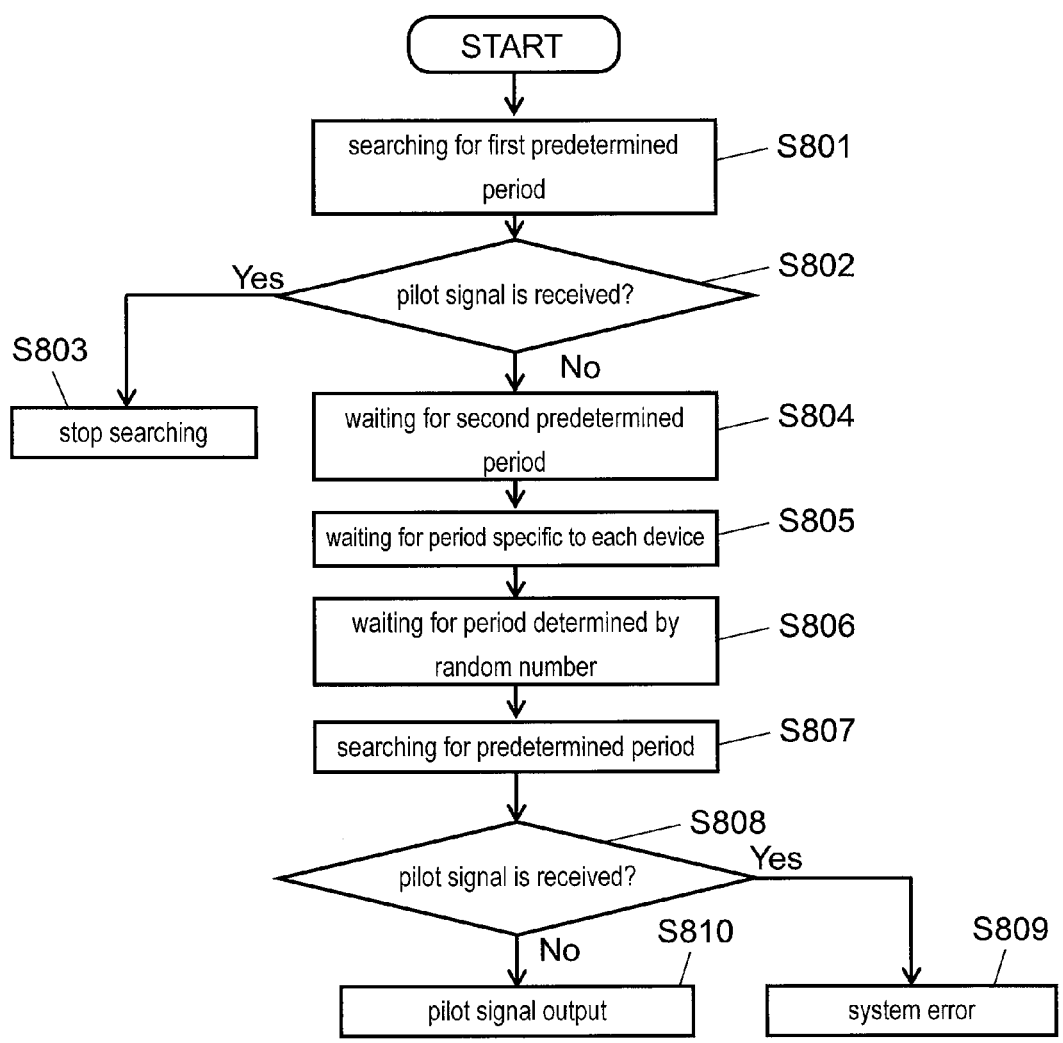
FIG. 14 is a flowchart illustrating the working procedure of a radio communication device that operates on a commercial power source in accordance with a fourth exemplary embodiment.

FIG. 14 is a flowchart illustrating the working procedure of commercial-power communication device 100 in accordance with the fourth exemplary embodiment.

In step S801, in response to power on, the commercial-power communication device 100 starts operation and performs pilot-signal search to detect a pilot signal within a first predetermined period of time (e.g. for three cycles; specifically, for 24 ms in the area having a voltage cycle of commercial AC power of 60 Hz, and for 30 ms in the area having a voltage cycle of 50 Hz). In step S802, device 100 determines whether a pilot signal is detected or not. If the device detects a pilot signal, the device stops the pilot-signal search in step S803, since it means the presence of another commercial-power communication device transmitting a search signal in the vicinity. After that, the device performs timing control based on the pilot signal, as described in the third embodiment.

If commercial-power communication device 100 has no detection of a pilot signal within the first predetermined period of time, the device gets into a waiting mode in step S804 and only waits a pilot signal for a second predetermined period of time (e.g. for 50 cycles; specifically, for 415 ms in the area having a voltage cycle of commercial AC power of 60 Hz, and for 500 ms in the area having a voltage cycle of 50 Hz).

After lapse of the second predetermined period of time, in step S805, commercial-power communication device 100 further waits for a pilot signal for the waiting time specifically determined to each device 100. The waiting time above is determined in a manner that the device intended to have the first-order priority to the pilot-signal transmitter has a short waiting time. A device intended to have the first-order priority is, for example, the device having high rate of possession in most houses and taking the central role for displaying information for the household.

After lapse of the waiting time in step S805, device 100 still further waits for a pilot signal for a waiting time in step S806. The waiting time is determined by random number generator (not shown) built in device 100. After lapse of the waiting time, in step S807, device 100 performs pilot-signal search within a period of time shorter than the first predetermined period of time. If device 100 detects a pilot signal within a predetermined of time in step S808, it is regarded as a system error in step S809. If no pilot signal is detected within the predetermined of time in step S808, device 100 transmits a pilot signal in step S810. After that, device 100 performs the procedures described in the third embodiment.

As described above, the structure of the embodiment allows commercial-power communication devices 100 to determine which device is to be the pilot-signal transmitter.

Industrial Applicability

The present invention provides a radio communication device capable of avoiding transmission interference with no necessity of constant use of the avoidance communication mode, maintaining an effective transmission rate even when a microwave oven is in operation. The present invention is therefore useful for a radio communication device; particularly, for a device that performs radio communication while a microwave oven is operating. Even under the conditions with a radiation effect from the microwave oven, the structure of present invention allows a radio communication device to maintain the communication distance.

Reference Marks in the Drawings
- 301, 401, 501 radio communication device
- 302 transmitter
- 303 receiver
- 304 transmission power changer
- 305 transmission rate changer
- 306 radiation detector
- 307 timing detector
- 308 controller
- 309 antenna
- 100 commercial-power communication device
- 102 frequency detector
- 103 pilot signal generator
- 104 radio transmitter/receiver
- 105 device controller
- 200 battery-power communication device
- 201 radio transmitter/receiver
- 202 pilot signal detector
- 203 data signal processor
- 204 controller
- 400 radio communication system

The invention claimed is:

1. A radio communication device comprising:
a receiver for receiving data;
a radiation detector for detecting electromagnetic interference (EMI) radiation from the data received by the receiver;
a timing detector for detecting a stopping time of EMI radiation;
a controller for changing a normal communication mode into an avoidance communication mode in response to EMI radiation detected by the radiation detector;
a transmitter for preparing a transmission packet in the avoidance communication mode so as to satisfy expressions of $T_1 = (T_0/2)/M$ and $T_2 = T_0/2$ (where $T_1$ represents a time required for transmission; $T_2$ represents a cycle of transmission; $T_0$ represents a cycle of an AC power source; and $M \geq 4$);

a transmission power changer for determining a transmission power of the transmission packet in the avoidance communication mode by multiplying $T_2/T_1$ to a transmission power in the normal communication mode; and a transmission rate changer for determining a transmission rate of the transmission packet in the avoidance communication mode by multiplying $T_2/T_1$ to a transmission rate in the normal communication mode, wherein, the transmitter transmits the transmission packet so as to be synchronized with the stopping time of EMI radiation.

2. The radio communication device of claim 1, wherein the radiation detector detects EMI radiation when the received data has a bit error by cycle $T_0/2$, and the timing detector detects the stopping time of EMI radiation according to a timing at which the received data has no bit error.

3. The radio communication device of claim 1, wherein the radiation detector detects EMI radiation when a received power detected by the receiver exhibits a periodic change with cycle $T_0/2$ during a period with no transmission from a radio communication device as a receiver, and the timing detector detects the stopping time of EMI radiation according to a timing of decreasing the received power.

4. The radio communication device of claim 1, wherein the controller effects control of the transmitter in a manner so as to transmit the transmission packet with transmission cycle $T_3 = (T_0/2) + T_4$, where $-T_0/2 \leq T_4 \leq T_0/2$), and the timing detector detects the stopping time of EMI radiation according to a response packet received by the receiver.

5. The radio communication device of claim 1, wherein, when the radiation detector detects occurrence of a bit error in a radio communication device on the receiver side from a response packet, the controller effects control of the transmitter in a manner so as to determine a timing of a successive transmission different from transmission cycle $T_2$ and to transmit the transmission packet with transmission time $T_1$ and with transmission cycle $T_2$.

* * * * *